106-18.15

Patented May 13, 1952

2,596,938

UNITED STATES PATENT OFFICE 2,596,938

COATING COMPOSITION COMPOSED OF NITROGEN - PHOSPHORUS COMPOUND WITH AN ALDEHYDE RESIN TOGETHER WITH A WATER-SOLUBLE ALKYD RESIN

Morris L. Nielsen, Russell W. Arnold, and Earl C. Chapin, Dayton, Ohio, assignors to Monsanto Chemical Company, St. Louis, Mo., a corporation of Delaware No Drawing. Application December 30, 1948, Serial No. 68,407

6 Claims. (Cl. 260—29.4)

The present invention is directed to fire-retarding coatings and to a method of manufacture thereof.

It is an object of the invention to provide compositions which may be utilized as surface coatings on wood and other combustible materials to render them resistant to fire.

It is another object to provide a novel method of manufacturing interior and exterior surface-protective coatings which are resistant against weather and wear as well as affording protection against fire.

It has been known in the art that certain inorganic phosphate salts have utility in the formulation of fireproofing compositions, but it has been a disadvantage of such inorganic salts that only a small proportion of the same could be incorporated into surface protective coatings such as paints, since these phosphate salts resulted in the formation of rough coating films. Some of these phosphate salts are water-soluble, resulting in their ready removal by water. Moreover, large amounts of the salts had to be employed to obtain a flame-resistant or fire-retarding effect.

It has now been found that fire-retarding compositions may be provided by the combination of certain water-soluble, alkyd resins, together with an aminoplast resin and a chemical compound to furnish nitrogen and phosphorus. The nitrogen-phosphorus component may be a condensation product of ammonia and phosphoryl chloride. One type of such compound is described by Mellor in Comprehensive Treatise on Inorganic and Theoretical Chemistry, 8, 713 (Longmans, Green and Company, New York, 1928). A preferred compound obtainable from the reaction of ammonia and phosphoryl chloride, is the insoluble, infusible product which has been designated as polyphosphorylamide. The preparation of the water-insoluble polyphosphorylamide is described in copending application, Serial No. 68,402, filed December 30, 1948, which application is assigned to the same assignee as is the present application. The polyphosphorylamide is a white powder, insoluble in water and having a substantially neutral or alkaline reaction. The nitrogen-phosphorus atomic ratio of the polymeric material lies in the range of 1.72:1 to 1.85:1, which relatively high range represents a product desirable in providing a composition which bulks up by releasing nitrogen compounds as gases when exposed to fire in the presence of nitrogen-containing resins such as aminoplasts.

The process is most conveniently carried out by passing gaseous ammonia into a solution of phosphorus oxychloride (also called phosphoryl chloride) dissolved in a hydrocarbon solvent boiling above 200° C. until at least 5 moles of ammonia per mole of phosphorus oxychloride have been added and combined therewith. It has been found that a definite compound is formed at this stage, although more ammonia may be added. The reaction is best carried out at temperatures below 100° C. and preferably above 20° C., utilizing normal pressure or elevated pressure. Since exothermic reaction heat is liberated it is desirable to cool the hydrocarbon solution during the reaction in order to maintain the temperature thereof between the above limits. The product formed by this initial reaction is a fine, white powder which consists of a mixture of a nitrogen-phosphorus containing body and ammonium chloride. The nitrogen-phosphorus containing body is at this stage water-soluble and alkaline in reaction. If desired, the reaction product may now be separated by filtration or by centrifuging from the hydrocarbon and the separated product treated according to the second step of our process.

Preferably the heating step may be carried out upon the reaction product produced by the first step while the product is still suspended or mixed with the original hydrocarbon solvent. This results in better yields and simplified operation, since the material may be handled more easily and without losses. The second step of our process involves heating the product produced in the first step to a temperature above 155° C., but below a temperature of 250° C., either at atmospheric or superatmospheric pressure. During the heating period, a small amount of ammonia is evolved which may be recovered and reused in the process. During the heating step the nitrogen-phosphorus product apparently undergoes a polymerization or molecular rearrangement, being converted thereby into a water-insoluble product of higher molecular weight.

*Example A*

One hundred parts of phosphoryl chloride was dissolved in 300 parts of kerosene of commercial grade. The kerosene had a boiling range of about 150° to 260° C. Anhydrous ammonia gas was then passed into the kerosene solution at a slow rate of addition, and simultaneously therewith, the solution was cooled in order to maintain the temperature below about 80° C. At the same time, efficient agitation of the solution was maintained. The addition of ammonia was continued in this manner until 5 moles of ammonia had been reacted with the phosphoryl chloride. The reaction product was insoluble in kerosene and appeared as a white powder suspended therein.

After completion of the ammonia addition, the reaction mixture, while remaining suspended in kerosene, was heated to a temperature of 200° C. After the temperature had reached 200° C., heating was discontinued and the mixture permitted to cool. During the heating period, some ammonia was evolved, the nitrogen-phosphorus product apparently undergoing polymerization and becoming water-insoluble. At the end of the heating period, which may be carried out for a period of from one-fourth to three hours, preferably one to three hours, the solids were removed from the kerosene by filtration or centrifuging. The product was next washed with water in sufficient amount so as to dissolve the ammonium chloride present in the product. The washing operation may also be followed by a heating step which is designed to dry the product and also to remove traces of the kerosene or other hydrocarbon. A convenient method for removing the hydrocarbon consists in steaming the product while it is contained in a rotating centrifuge.

The nitrogen-phosphorus containing product, resulting from the present process, is substantially insoluble in water as well as organic solvents. It may be suspended or dispersed in water and will then exhibit a pH which is substantially neutral or alkaline in reaction. The final product is free from chlorine as a result of the heating and polymerization step, which makes it possible for the ammonium chloride to be completely removed to leave only the condensation product consisting essentially of nitrogen, oxygen, hydrogen and phosphorus. The nitrogen-phosphorus atomic ratio is approximately 1.80:1, but may be varied within the range of 1.5:1 to 2.0:1 by variation of the amount of $NH_3$ initially reacted with the $POCl_3$ and this product to some degree polymerized, and then subjected to heating as described above, to complete the polymerization. The preferred N:P ratio suitable for most purposes varies from 1.70:1 to 1.95:1.

The nitrogen-containing resins contemplated in the present invention may be characterized as aminoplasts. As is well known, aminoplasts are resins derived from amino (including imino) or amido (including imido) compounds, a typical example being urea-formaldehyde resin (reference: Modern Plastics, 17, 433, 1939). Other aminoplasts, such as are described in C. Ellis, Chemistry of Synthetic Resins, Chapter 26, (Reinhold Publishing Company, 1935) and R. Nauth, Chemistry and Technology of Plastics, Chapter 3 (Reinhold Publishing Company, 1947), which may be employed in the combination composition of the present invention are the formaldehyde condensation products with urea, melamine, thiourea, guanidine, cyanamide, dicyandiamide, and also the corresponding furfural condensation products in the same relationship. Such resinous compositions may employ high, medium or low degrees of methylolation (or the corresponding furfural substituents) such as from 1 to 6 methylol radicals per mole of the acceptor compound in the case of melamine. The use of the alkylated modifications of such resins is likewise contemplated, particularly in the butylated modifications such as are conventional in urea-formaldehyde and melamine-formaldehyde resins.

In addition to the synthetic type of resins, as set forth above, it is also possible to utilize nitrogen-containing, resinous materials derived from natural sources, such as casein. The casein compositions insolubilized by formaldehyde are of particular utility for this purpose. Such polyamide resins, as may be brought into solution or dispersion for use in the present compositions, may also be introduced into the formulations of the present invention.

In the embodiment of the invention as a water paint or emulsion, it is desirable that the resinous constituent be water-soluble. For this purpose the intermediate stage of the condensation product of the particular resin is employed. Upon application of the fire-retardant material comprising the nitrogen-containing resin in combination with the reaction product of phosphoryl chloride and ammonia, the resin forms a continuous surface film in which the phosphorus compound is dispersed.

Upon exposure of the film to fire it has been found that a chemical reaction takes place in which the nitrogen of the aminoplast resin apparently reacts with the phosphorus and nitrogen supplied from the polyphosphorylamide or other reaction product of phosphoryl chloride and ammonia. This chemical reaction results in the generation of non-burning gases which permeate and swell the coating film to form a porous, insulating layer. This action, which is termed intumescence, forms an adherent, fluffy char which does not burn. Consequently, the combustible foundation material does not itself burn, since it is protected by the heat-insulating, fire-retarding overlayer.

The technical term "fire-retarding" is used herein according to the terminology set forth in Fire-Retarding Coatings (Revised January, 1946) Forest Products Laboratory Bulletin No. R 1280, United States Department of Agriculture.

It has now been found that the combination of an aminoplast resin and the reaction product of phosphoryl chloride and ammonia may be improved by the combination therewith of a water-soluble, alkyd resin.

The water-soluble, alkyd resins which have been found useful in this relationship function to cross-link with the aminoplast resinous material. Such water-soluble, alkyd resins are of particular utility for application of the fire-retardant composition in the form of an emulsion such as a water paint. When such composition has once been applied, it has been found that the resinous constituents rapidly cure to complete the polymerization. The final product is, therefore, a hard, weather-resisting, insoluble, continuous film in which the phosphorus compound such as the polyphosphorylamide is dispersed uniformly throughout the film. The improvement realized in the coating composition by the use of water-soluble, alkyd resins is shown in the greater ease of application and in the rapid cross-linking or polymerization which takes place.

It is desirable in the formulation of fire-retarding compositions based upon the present invention, that a two-component mixture be supplied for final mixing shortly prior to the application of the coating composition. Thus, the phosphorus compound exemplified by polyphosphorylamide may be premixed with the aminoplast resin. This preliminary mixture may then be mixed at the time of use with the water-soluble, alkyd resin. The resultant mixture may then be applied to produce the fire-retarding coating composition. However, the phosphorus compound may also be introduced with the alkyd component, and such mixture may then be combined with the aminoplast resin.

Such mixtures are characterized by a controlled rate of polymerization so that the material may be applied at a convenient rate and will then polymerize or cure very rapidly after application to give an insoluble, water-resistant composition as a result of the cross-linking which takes place with the aminoplast resin.

The water-soluble, alkyd resins, which are contemplated for use in the fire-retarding coating compositions, may be produced by the interaction of citric acid and glycerol in equimolar proportions. In general such water-soluble, alkyd resins may be prepared from an $\alpha$-hydroxypolycarboxylic acid by reaction with a polyhydroxy alcohol. Suitable acids which may be used in the practice of this invention are malic acid, tartaric acid, citramalic acid, tartronic acid, citric acid or any other aliphatic polycarboxylic acid which has an hydroxy substituent on a carbon atom adjacent to a carboxylic acid radical.

Suitable polyalcohols which may be used are ethylene glycol, trimethylene glycol, 1,2-propylene glycol, tetramethylene glycol, 1,3-butylene glycol, pentamethylene glycol, hexamethylene glycol, decamethylene glycol, or any other aliphatic hydrocarbon glycol, isomeric or homologous thereto. The invention is also practicable with the ether glycols, such as diethylene glycol, triethylene glycol, tetraethylene glycol, the higher polyethylene glycol, or mixtures thereof, dipropylene glycol and other oxohydrocarbon glycols containing two hydroxy radicals and at least one ether oxygen group in a carbon chain between the hydroxyl groups. Although the preferred practice of the invention involves the use of glycols, aliphatic polyhydroxy compounds having more than two hydroxyls are also useful, for example, glycerol, erythritol and pentaerythritol, but when these are used care should be taken to avoid overheating during the alkyd preparation. The higher polyhydroxy compounds can be effectively used if the reaction is stopped short of gelation.

The preparation of the water-soluble, alkyd resins utilized in the present invention is shown in greater detail in copending application Serial No. 51,296, filed September 25, 1948, now abandoned, and assigned to the same assignee as is the present application.

In the formulation of fire-retarding coating compositions the aminoplast resin may be employed in proportions ranging from 10% to 50% by weight, the water-soluble, alkyd resin may be present in the concentration range of 3% to 25%, and the polyphosphorylamide or other phosphorus compound may be present in a concentration range of from 10% to 90%. The polyphosphorylamide content may be varied over wide ranges since higher proportions of this material are desirable, not only because of the fire-retarding qualities inherent in said material, but also because of the pigmenting effect which is realized by the use of this dense, white powder.

Other pigments, dyes, fillers and the like, such as are conventional in the formulation of paint materials, may be utilized. In addition, plasticizers such as carboxy methyl cellulose, mannitol, sorbitol and pentaerythritol may be utilized. Such other pigments may be present in the range of from 0.5% to 10%, and the plasticizers in the concentration range of from 0.5% to 10%. The proportions herein stated are referred to the weight ratio of the materials based upon the solid constituents. For utilization as water dispersions or so-called water paints, emulsifying agents, such as are conventional in this field, may be utilized. Further plasticization, if desired for flexible films, may be provided by the use of plasticizers. One type of polyhydroxy compounds useful as plasticizers in the relationship is described in copending application Serial No. 68,408, filed December 30, 1948.

Illustrative of certain embodiments of the present invention, but not limitative of the scope of the said invention, the following examples illustrate how the compositions of the present invention may be manufactured.

*Example 1*

| | Parts |
|---|---|
| Urea-formaldehyde condensation product (water-soluble) | 28 |
| Water-soluble alkyd based upon 1:1 ratio of citric acid and glycerol | 7 |
| Polyphosphorylamide | 11 |
| Titanium dioxide | 3 |
| Water | 51 |

The above composition, when applied to test panels of wood, gave dense coatings having a smooth finish, which was quite stable against weathering. The coating compositions also cured rapidly. When test panels, coated with the above composition, were subjected to the standard fire tests, such as those proposed in the American Paint Journal Convention Daily, pages 8–30 (November 6, 1946), it was found that the coating provided adequate protection as a fire-retarding material. In carrying out the fire-retarding test, the above method was modified by the substitution of a gas micro-burner for the alcohol cup. The wooden panels, when heated by the flame of the Bunsen burner, showed a freedom from flame propagation during the standard test period of three minutes. The final result, after applying a flame to the treated panel, was the production of an adherent, porous char overlayer which was thick and frothy, thereby preventing transfer of heat to the undersurface.

*Example 2*

| | Parts |
|---|---|
| Urea-formaldehyde condensation product (water-soluble) | 17 |
| Citric acid glycerol resin (alkyd) | 16 |
| Polyphosphorylamide | 13 |
| Titanium dioxide | 2 |
| Water | 52 |

Formulation of the above composition showed the liquid mixture to be stable for several hours, but upon application cross-linking and polymerization took place rapidly to yield a water-insoluble coating film. This coating, when applied as a test film on wood panels, easily passed the standard test as discussed above with reference to a fire-retarding effect.

Example 3

| | Parts |
|---|---|
| Urea-formaldehyde condensation product (water-soluble) | 25 |
| Alkyd based upon 1:1 molar ratio of citric acid and ethylene glycol | 7 |
| Polyphosphorylamide | 10 |
| Mannitol (plasticizer) | 5 |
| Titanium dioxide | 2 |
| Water | 51 |

The above composition, when applied as a coating film to various surfaces, showed extreme flexibility and resistance against weathering. The test panels of poplar wood, when subjected to the standard fire test, showed adequate resistance as a fire-retarding material.

The coating composition of the present invention may be applied by brushing, dipping or spraying, in accordance with the methods which have been employed with various coating materials.

This application contains subject matter in common with certain other applications assigned to the same assignee as is the present application: Serial No. 68,402, filed December 30, 1948, relating to the water-insoluble composition of matter resulting from the reaction of phosphoryl chloride and anhydrous ammonia;

Serial No. 68,403, filed December 30, 1948, relating to a water paint comprising a dispersion of the water-insoluble reaction product of phosphoryl chloride and anhydrous ammonia in combination with water-soluble, nitrogen-containing resinous materials;

Serial No. 68,404, filed December 30, 1948, relating to a flameproofing treatment for cotton by the application thereto of the water-insoluble reaction product of phosphoryl oxychloride and anhydrous ammonia;

Serial No. 68,405, filed December 30, 1948, relating to compositions comprising phenol-formaldehyde resins in combination with the water-insoluble reaction product of phosphoryl chloride and anhydrous ammonia;

Serial No. 68,408, filed December 30, 1948, relating to water emulsion paints comprising the combination of a nitrogen-containing resin and the water-insoluble reaction product of phosphoryl chloride and anhydrous ammonia together with polyhydroxy compounds such as pentaerythritol;

Serial No. 68,409, filed December 30, 1948, relating to a coating composition comprising an organic solvent containing organic, film-forming resins in combination with the water-insoluble reaction product of phosphoryl chloride and anhydrous ammonia;

Serial No. 68,410, filed December 30, 1948, relating to the combination of the water-insoluble reaction product of phosphoryl chloride and anhydrous ammonia together with chlorinated rubber;

Serial No. 68,411, filed December 30, 1948, relating to flameproofed cloth having deposited thereon the combination of the water-insoluble reaction product of phosphoryl chloride and anhydrous ammonia together with antimony oxide and polyvinyl chloride;

Serial No. 136,135, filed December 30, 1949, relating to glowproofing compositions comprising the combination of the reaction product of phosphoryl chloride and anhydrous ammonia together with antimony oxide and chlorinated paraffins;

Serial No. 136,136, filed December 30, 1949, relating to compositions comprising the combination of the reaction product of phosphoryl chloride and anhydrous ammonia together with compounds having free hydroxy radicals such as pentaerythritol.

It will be obvious to those skilled in the art that changes in the formulae may be made without departing from the spirit and scope of the invention. The above embodiments of the invention are merely suggestive and exemplary, it being understood that the applicants are entitled to protection on all such uses and formulations where the compositions produced are new. The invention is not to be limited to the specific compositions herein described or specifically covered by the claims.

What is claimed and desired to be protected by Letters Patent of the United States is:

1. A film-forming coating composition characterized by fire-retarding properties, said coating composition being composed of a dispersion of water and the following components dispersed therein:

| | Per cent |
|---|---|
| Water-soluble resin selected from the group consisting of melamine-formaldehyde and urea-formaldehyde condensation products | 10–50 |
| The water-insoluble reaction product of phosphoryl chloride and anhydrous ammonia, having a N/P ratio within the range of 1.72:1 to 1.85:1 | 10–90 |
| Water-soluble alkyd resin from α-hydroxy polycarboxylic acid and a polyhydric aliphatic compound | 3–25 | wherein the percentage compositions refer to the total solids.

2. A film-forming coating composition characterized by fire-retarding properties, said coating composition being composed of a dispersion of water and the following components dispersed therein:

| | Per cent |
|---|---|
| Water-soluble melamine-formaldehyde condensation product | 10–50 |
| The water-insoluble reaction product of phosphoryl chloride and anhydrous ammonia having a N/P ratio in the range of 1.72:1 to 1.85:1 | 10–90 |
| Water-soluble alkyd resin from α-hydroxy polycarboxylic acid and a polyhydric aliphatic compound | 3–25 | wherein the percentage compositions refer to the total solids.

3. A film-forming coating composition characterized by fire-retarding properties, said coating composition being composed of a dispersion of water and the following components dispersed therein:

| | Per cent |
|---|---|
| Water-soluble urea-formaldehyde condensation product | 10–50 |
| The water-insoluble reaction product of phosphoryl chloride and anhydrous ammonia, having a N/P ratio in the range of 1.72:1 to 1.85:1 | 10–90 |
| Water-soluble alkyl resin from α-hydroxy polycarboxylic acid and a polyhydric aliphatic compound | 3–25 | wherein the percentage compositions refer to the total solids.

4. A film-forming coating composition characing composition being composed of a dispersion of water and the following components dispersed therein:

| | Per cent |
|---|---|
| Water-soluble urea-formaldehyde condensation product | 10–50 |
| The water-insoluble reaction product of phosphoryl chloride and anhydrous ammonia, having a N/P ratio in the range of 1.72:1 to 1.85:1 | 10–90 |
| Citric acid-glycerine condensation product (water-soluble) | 3–25 | wherein the percentage compositions refer to the total solids.

5. A liquid, film-forming coating composition characterized by fire-retarding properties, said coating composition being composed of the following components in approximate proportions in parts by weight:

| | Parts |
|---|---|
| Water-soluble urea-formaldehyde condensation product | 28 |
| The water-insoluble reaction product of phosphoryl chloride and anhydrous ammonia, having a N/P ratio in the range of 1.72:1 to 1.85:1 | 11 |
| Citric acid-glycerol alkyd (1:1), water-soluble | 7 |
| Water | 51 |

6. A film-forming coating composition characterized by fire-retarding properties, said coating composition being composed of a dispersion of water and the following components dispersed therein:

| | Per cent |
|---|---|
| Water-soluble melamine-formaldehyde condensation product | 10–50 |
| The water-insoluble reaction product of phosphoryl chloride and anhydrous ammonia, having a N/P ratio in the range of 1.72:1 to 1.85:1 | 10–90 |
| Citric acid-glycerine condensation product (water-soluble) | 3–25 | wherein the percentage compositions refer to the total solids.

MORRIS L. NIELSEN.
RUSSELL W. ARNOLD.
EARL C. CHAPIN.

REFERENCES CITED

The following references are of record in the file of this patent:

UNITED STATES PATENTS

| Number | Name | Date |
|---|---|---|
| 2,386,744 | Myers | Oct. 9, 1945 |
| 2,464,342 | Pollak | Mar. 15, 1949 |

OTHER REFERENCES

Mellor, Comprehensive Treatise on Inorganic and Theoretical Chemistry, vol. 8 (1928), pages 704–720.